(12) United States Patent
Su et al.

(10) Patent No.: US 12,095,290 B2
(45) Date of Patent: Sep. 17, 2024

(54) CHARGING DEVICE AND CHARGING SYSTEM BASED ON MASTER-SLAVE RELATIONSHIP

(71) Applicant: CANYON SEMICONDUCTOR INC., Hsinchu (TW)

(72) Inventors: Tzu Chieh Su, Hsinchu (TW); Keng Chuan Chang, Hsinchu (TW); Hsiu Ming Yang, Hsinchu (TW)

(73) Assignee: CANYON SEMICONDUCTOR INC., Hsinchu (TW)

( * ) Notice: Subject to any disclaimer, the term of this patent is extended or adjusted under 35 U.S.C. 154(b) by 519 days.

(21) Appl. No.: 17/481,648

(22) Filed: Sep. 22, 2021

(65) Prior Publication Data
US 2023/0093533 A1    Mar. 23, 2023

(51) Int. Cl.
*H02J 7/00* (2006.01)
(52) U.S. Cl.
CPC ......... *H02J 7/0013* (2013.01); *H02J 2310/52* (2020.01); *H02J 2310/66* (2020.01)
(58) Field of Classification Search
USPC ....................................................... 320/137
See application file for complete search history.

(56) References Cited

U.S. PATENT DOCUMENTS

| 2008/0272736 | A1  | 11/2008 | Tien et al. |
| 2017/0005501 | A1* | 1/2017  | Yi ............... H02J 7/00718 |
| 2017/0133862 | A1* | 5/2017  | Jung ............. H01M 10/46 |

FOREIGN PATENT DOCUMENTS

| CN | 106160054 A | 11/2016 |
| CN | 113346600 A | 9/2021  |
| TW | M422229 U   | 2/2012  |

OTHER PUBLICATIONS

Office Action from corresponding Taiwan Application No. 110140966 dated Oct. 5, 2022, 7 pages.

\* cited by examiner

*Primary Examiner* — Samuel Berhanu
(74) *Attorney, Agent, or Firm* — Cooper Legal Group LLC

(57) ABSTRACT

A charging system based on a master-slave relationship includes a master charging device coupled with a target device, and at least one slave charging device electrically connected with the master charging device. An edge slave charging device among the at least one slave charging device is coupled with a power source. The master charging device determines a power-output distribution of the master charging device and the at least one slave charging device, and notifies the at least one slave charging device of the power-output distribution. The at least one slave charging device provides a supplementary power to the master charging device according to the power-output distribution. The master charging device further provides a specific power for the target device based on the supplementary power, so as to charge the target device in cooperation with the at least one slave charging device.

20 Claims, 3 Drawing Sheets

CHARGING DEVICE AND CHARGING SYSTEM BASED ON MASTER-SLAVE RELATIONSHIP

BACKGROUND

Technical Field

The present disclosure relates to a charging device and a charging system. More specifically, the present disclosure relates to a charging device and a charging system that operate based on a master-slave relationship.

Descriptions of the Related Art

With the rapid development of the fast-charging technologies such as Power Delivery (PD), Quick Charge (QC), Fast Charge Protocol (FCP), Super Charge Protocol (SCP) or the like, high-power chargers are playing an important role on the mainstream market. However, to ensure a high-power output, conventional chargers are either bulky in volume or with high cost due to their special material such as Gallium nitride (GaN), and either way fails to provide a flexibility of maximum wattage. Some conventional chargers are expandable by including a pluggable (by other chargers) design in the form of sockets, but the quantity of their sockets (i.e., the quantity of supported chargers) is fixed since manufacture, and their logic for dealing with the chargers plugged in is predefined in accordance with the fixed quantity of sockets. Thus, conventional chargers are still far from being truly flexible when it comes to maximum wattage supported. In view of this, there is an urgent need in the art for a charging system that provide not only a high-power output but also a true flexibility of maximum wattage supported.

SUMMARY

To solve at least the aforementioned problem, the present disclosure provides a charging device. The charging device comprises a processing unit, a communication interface, a power-controller module, a power-control interface and a charging interface. The communication interface is electrically connected with the processing unit and is capable of coupling the processing unit with at least one cooperating charging device. The power-controller module is electrically connected with the processing unit and the power-control interface. The power-control interface is capable of coupling the power-controller module with the at least one cooperating charging device. The charging interface is electrically connected with the processing unit and the power-controller module. The processing unit is configured to determine a character of the charging device in a master-slave relationship with the at least one cooperating charging device based on whether a target device is attached to the charging interface. The power-controller module is configured to provide a specific power for a target device in cooperation with the at least one cooperating charging device based on the character.

To solve at least the aforementioned problem, the present disclosure also provides a charging system based on a master-slave relationship. The charging system comprises a master charging device and at least one slave charging device. The master charging device is coupled with a target device. The at least one slave charging device is electrically connected with the master charging device. An edge slave charging device among the at least one slave charging device is coupled with a power source. The master charging device is configured to determine a power-output distribution of the master charging device and the at least one slave charging device, and notify the at least one slave charging device of the power-output distribution. The at least one slave charging device is configured to provide a supplementary power to the master charging device according to the power-output distribution. The master charging device is further configured to provide a specific power for the target device based on the supplementary power, so as to charge the target device in cooperation with the at least one slave charging device.

The charging devices of the present disclosure are electrically connected and cooperate based on master-slave relationship. The quantity of slave charging device may be arbitrarily increased by being attached to the charging system in a way similar to the existing slave charging device, without being limited to a fixed number. Thus, the maximum wattage that the master charging device is able to provide for the target device may be increased accordingly. Therefore, the system of charging devices based on a master-slave relationship of the present disclosure certainly has solved the aforementioned problem in the art.

This summary overall describes the core concept of the present disclosure and covers the problem to be solved, the means to solve the problem and the effect of the present disclosure to provide a basic understanding of the present disclosure by those of ordinary skill in the art. However, it shall be appreciated that, this summary is not intended to encompass all embodiments of the present disclosure but is provided only to present the core concept of the present disclosure in a simple form and as an introduction to the following detailed description. The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The drawings can assist the description of the present disclosure, wherein.

DETAILED DESCRIPTION

The embodiments described below are not intended to limit the invention to any specific environment, applications, structures, processes or steps described in these embodiments. In the attached drawings, elements unrelated to the present invention are omitted from depiction. Dimensions and dimensional relationships among individual elements in the attached drawings are only exemplary examples and are not intended to limit the present invention. Unless stated particularly, same (or similar) element numerals may correspond to same (or similar) elements in the following description.

The terminology used herein is for the purpose of describing the embodiments only and is not intended to limit the present invention. The singular forms "a" and "an" are intended to include the plural forms as well, unless the context clearly indicates otherwise. The terms "comprises," "comprising," "includes," "including," etc., specify the presence of the stated features, integers, steps, operations, elements, and/or components, but do not preclude the presence or addition of one or more other features, integers, steps, operations, elements, components, and/or groups thereof. The term "and/or" includes any and all combinations of one or more of the associated listed items. Although the terms "first," "second," "third," etc., may be used herein to describe various elements, these elements should not be limited by these terms. These terms are merely used to distinguish one element from another element. Thus, for example, a first element described below could also be termed a second element, without departing from the spirit and scope of the present invention.

Figure 1:
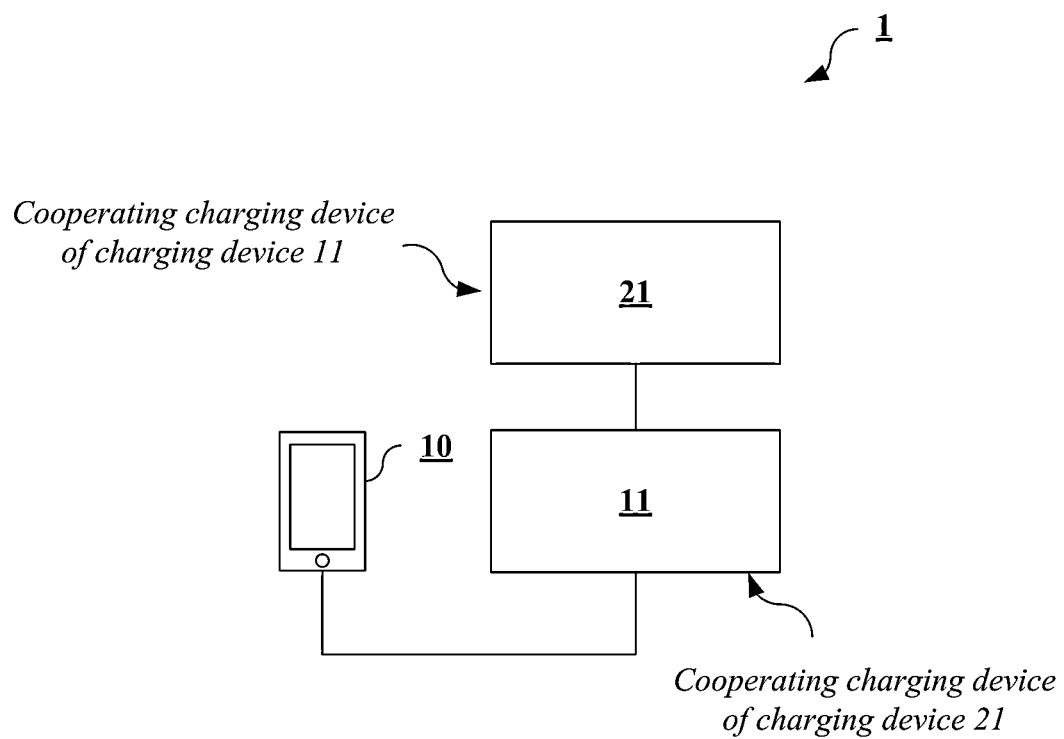
FIG. 1 depicts a schematic view of a charging system according to one or more embodiments of the present disclosure.
Figure 2:
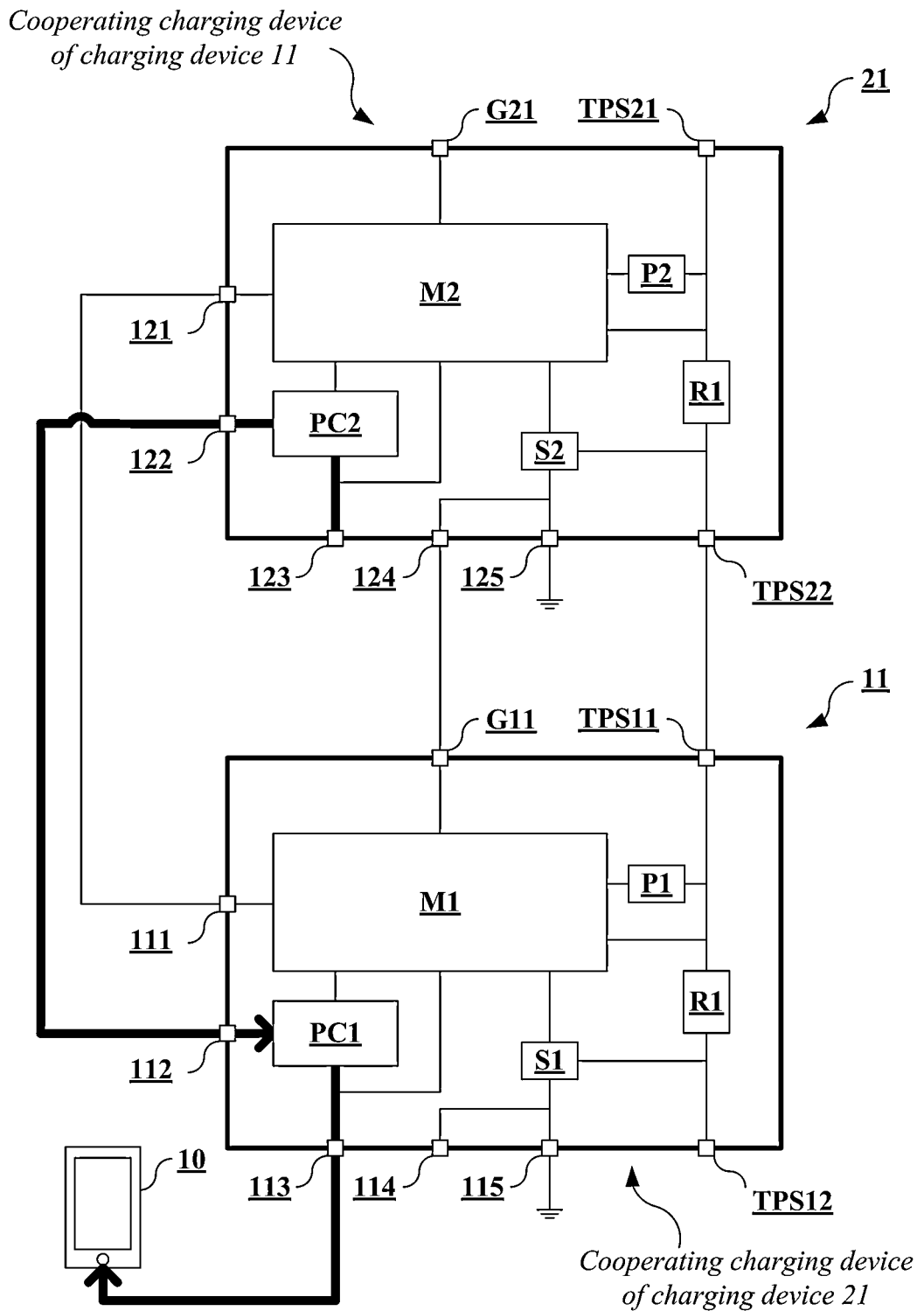
FIG. 2 depicts a more detailed schematic view of the charging system as depicted in FIG. 1.

FIG. 1 depicts a schematic view of a charging system according to one or more embodiments of the present disclosure. FIG. 2 depicts a more detailed schematic view of the charging system as depicted in FIG. 1. The contents shown in FIG. 1 and FIG. 2 are only for illustrating the embodiment of the present disclosure, instead of limiting the present disclosure.

Referring to FIG. 1 and FIG. 2 together, a charging system 1 for charging a target device 10 may comprise a plurality of charging devices, e.g., charging devices 11 and 21. The target device 10 may be one of various kinds of electronic devices that comprises a chargeable battery, such as a smartphone, a laptop computer, a tablet computer, a smartwatch, a camera, etc.

The charging device 11 may comprise at least a processing unit M1, a communication interface 111, a power-controller module PC1, a power-control interface 112 and a charging interface 113. The processing unit M1 may be electrically connected with the communication interface 111 and the power-controller module PC1. The power-controller module PC1 may be electrically connected with the power-control interface 112. The charging interface 113 may be electrically connected with the processing unit M1 and the power-controller module PC1.

The charging devices of the charging system 1 may share a similar structural design, in some embodiments even sharing the same design. Therefore, the charging device 21 may comprise at least a processing unit M2, a communication interface 121, a power-controller module PC2, a power-control interface 122 and a charging interface 123. The processing unit M2 may be electrically connected with the communication interface 121 and the power-controller module PC2. The power-controller module PC2 may be electrically connected with the power-control interface 122. The charging interface 123 may be electrically connected with the processing unit M2 and the power-controller module PC2.

Each of the processing units M1 and M2 may be a microprocessor or a microcontroller or the like with a signal processing function. A microprocessor or microcontroller is a special programmable integrated circuit, which has the capabilities of calculation, storage, output/input, etc., and can accept and process various coding instructions, so as to perform various logic operations and arithmetic operations, and output the corresponding calculation result. The processing units M1 and M2 can be programmed to interpret various instructions and perform various calculation tasks or programs. For example, each of the processing units M1 and M2 may be a micro controller unit (MCU).

Each of the communication interfaces 111 and 121 may be an interface capable of transmitting information of the charging device, especially the information of the processing units M1 and M2, to external devices, and receiving information from those external devices. Each of the communication interfaces 111 and 121 may be a component that provides wired and/or wireless communication functionality, and in some embodiments, the processing units M1 and M2 may comprise a corresponding firmware/software for driving said component, respectively.

For example, each of the communication interfaces 111 and 121 may be an inter-integrated circuit ($I^2C$) interface implemented as an $I^2C$ connection port. For another example, each of the communication interfaces 111 and 121 may be a transceiver for wireless communication, such as antennas, amplifiers, modulators, demodulators, detectors, analog-to-digital converters, digital-to-analog converters, etc. For yet another example, each of the communication interfaces 111 and 121 may be a transceiver for wired communication, such as a gigabit Ethernet transceiver, a gigabit interface converter (GBIC), a small form-factor pluggable (SFP) transceiver, a ten-gigabit small form-factor pluggable (XFP) transceiver, etc.

The communication interfaces 111 and 121 are capable of coupling the processing unit M1 with the processing unit M2, such that the charging devices 11 and 21 can communicate with each other through the communication interfaces 111 and 121. It should be noted that the communication interfaces 111 and 121 are not necessarily the same, as long as they are compatible with each other so that the communication among the charging devices can be established and function normally.

Each of the power-controller modules PC1 and PC2 may be a circuit comprising at least a power management IC and the necessary components around it, such as bridges, capacitors, transformers, MOSFETs, resistors or the like, so as to control the input power and the output power of the charging devices 11 and 21, respectively. For example, the power-controller module PC1 may increase the output voltage of the charging device 11 according to the command of the processing unit M1, such that higher wattage of power may be output by the charging device 11. Similarly, the power-controller module PC2 may increase the output voltage of the charging device 21 according to the command of the processing unit M2, such that higher wattage of power may be output by the charging device 21. The structural details of the power-controller modules PC1 and PC2 for implementing the adjustment of input/output power can be readily known by those of ordinary skills in the art, and thus are not completely described herein.

The power-control interface 112 may be a corresponding voltage bus of the power-controller module PC1 and may be used for transmitting power into or out from the charging device 11. Similarly, the power-control interface 122 may be a corresponding voltage bus of the power-controller module PC2 and may be used for transmitting power into or out from the charging device 21. The power-control interfaces 112 and 122 can couple the power-controller module PC1 with the power-controller module PC2.

The charging devices 11 and 21 may cooperate with each other to charge the target device 10, and thus the charging devices 11 and 21 may serve as a cooperating charging device for each other. Specifically, the charging devices 11 and 21 may cooperate under a master-slave relationship, with the charging device 11 that is electrically connected with the target device 10 being the master, and the charging device 21 being the slave. The processing unit M1 may be configured to determine a character of the charging device 11 in a master-slave relationship with the charging device 21 based on whether the target device 10 is attached to the charging interface 113. Similarly, the processing unit M2 may also be configured to determine a character of the charging device 21 based on whether the target device 10 is attached to the charging interface 123. That is, when the charging devices 11 and 21 are used for charging the target device, the one coupled with the target device 10 may be the master, and the rest may be the slave.

For ease of description, charging devices that act as the master (e.g., the charging device 11) of the master-slave relationship may alternatively be referred to as "master charging devices" in the following description. Similarly, charging devices that act as the slave (e.g., the charging device 21) of the master-slave relationship may alternatively be referred to as "slave charging devices" in the following description.

Each of the charging interfaces 113 and 123 may be an interface capable of providing power supply and data transmission functionality, such as universal serial bus type-A (USB-A), universal serial bus type-C (USB-C), Lightning, or the like, and may be implemented as a port or a connector. In some embodiments, the charging interface may support fast-charging protocols such as Power Delivery (PD), Quick Charge (QC), Fast Charge Protocol (FCP), Super Charge Protocol (SCP), etc.

In some embodiments, the path between the power-controller module PC1 and the charging interface 113 may be used to transmit power, and may be implemented by wires corresponding to such as the Vbus pin and the GND pin. Moreover, the path between the processing unit M1 and the charging interface 113 may be used to transmit data, specifically the data of a fast-charging protocols. The path between the processing unit M1 and the charging interface 113 may be implemented by wires corresponding to the pins such as CC1, CC2, D+, D−, etc. The charging device 11 may be coupled with the target device 10 through the charging interface 113. The processing unit M1 may detect, through the charging interface 113, the attachment/detachment of the target device 10 (e.g., based on the attach/detach detection of fast-charging protocols), and may start a fast-charging-based communication with the target device 10 through the charging interface 113 when detecting that the target device 10 has been attached to the charging device 11.

The charging device 11 may comprise a first electrical connection port TPS11 and a second electrical connection port TPS12, and the charging device 21 may similarly comprise a first electrical connection port TPS21 and a second electrical connection port TPS22. The first electrical connection ports TPS11 and TPS21 may being electrically connected with the processing units M1 and M2, respectively, and may be used for coupling with the second electrical connection port of another device or coupling with a power source. Correspondingly, the second electrical connection ports TPS12 and TPS22 may also be electrically connected with the processing units M1 and M2, respectively, and may be used for coupling with the first electrical connection port of another device or coupling with the ground.

The charging system 1 comprises at least one slave charging device, among which an edge slave charging device may activate a power source included therein. In the case shown by FIG. 1 and FIG. 2, there is only one slave charging device, therefore the charging device 21 also acts as the edge slave charging device. Under such circumstance, a power source P2 may be activated for the power supply to internal circuits in the charging device 21.

The first electrical connection port TPS11 may be coupled with the second electrical connection port TPS22, such that the charging devices 11 and 21 may form a circuit. Each of the charging devices 11 and 21 may comprise a resistor R1 coupled between its own first and second electrical connection port.

The charging device 11 may comprise an input/output (I/O) port G11 electrically connected with the processing unit M1. The charging device 21 may similarly comprise an I/O port G21 electrically connected with the processing unit M2. The I/O ports G11 and G21 may be configured for determining the edge slave charging device. Specifically, when the I/O port of a slave charging device is floating (i.e., not connected to any exterior level/device), the slave charging device may be considered an edge slave charging device. In some embodiments, the charging devices 11 and 21 may comprise electrical connection ports 114 and 124, respectively, so as to provide access to an exterior level/device for other charging devices.

In the case shown by FIG. 1 and FIG. 2, the I/O port G21 is floating, and the I/O port G11 is coupled to a specific level (e.g., the ground level) due to its connection with the electrical connection port 124 of the charging device 21. Since the I/O port G21 is floating, the processing unit M2 may activate the power-source P2, so as to provide power for the resistor R1 of the charging device 21. On the other hand, the processing unit M1 may not activate the power source P1 to provide power for the resistor R1 of the charging device 11, because the I/O port G11 is occupied by/coupled with the charging device 21.

In some embodiments, the charging device 11 may comprise an electrical connection port 115 deployed between the ground and the switch S1, and the charging device 21 may comprise an electrical connection port 125 deployed between the ground and the switch S2. The charging device 11 may further comprise a switch S1 coupled with the processing unit M1 and between the electrical connection port 115 and the second electrical connection port TPS12, and the processing unit M1 may control the switch S1 to affect the state of connection between the second electrical connection port TPS12 and the electrical connection port 115. Similarly, the charging device 21 may further comprise a switch S2 coupled with the processing unit M2 and between the electrical connection port 125 and the second electrical connection port TPS22, and the processing unit M2 may control the switch S2 to affect the state of connection between the second electrical connection port TPS22 and the electrical connection port 125.

In some embodiments, the I/O ports G11 and G21 may be one type of the general-purpose input/output (GPIO) port, e.g., a GPIO1 port.

As mentioned before, the charging device 11 is coupled with the target device 10, hence it became the master charging device. When detecting, through the charging interface 113, that the target device 10 has been attached to the charging device 11, the processing unit M1 may turn on the switch S1 (e.g., by providing a signal such as a logical one) such that the second electrical connection port TPS12 is coupled to the ground. On the other hand, the processing unit M2 may turned off the switch S2 when detecting that no device is attached to the charging device 21 through the charging interface 123, such that the second electrical connection port TPS22 is coupled with the first electrical connection port TPS11 only, and that the resistors R1 of the charging devices 11 and 21 are coupled with each other.

Then, the charging device 11 may first determine a quantity of slave charging device, and then assign an address for each slave charging device based on the quantity. To do so, in some embodiments, the processing unit M1 may determine the quantity based on the voltages detected at the first electrical connection ports TPS11 and TPS21. Specifically, the processing unit M1 may first turn on the switch S1 to introduce the ground signal. After that, the power source P2 may be activated and the power source P1 may be not activated, since the I/O port G21 of the charging device 21 is floating while the I/O port G11 of the charging device 11 is in the state of connection. The resistors R1 of the charging devices 11 and 21 may thus be coupled with each other, thereby forming a voltage divider. As a result, a voltage may be detected at the first electrical connection ports TPS21 and TPS11 by the processing units M2 and M1, respectively. The processing unit M2 may thus transmit a voltage information regarding the first electrical connection port TPS21 to the processing unit M1 through the communication interface 121, and the processing unit M1 may receive the voltage information through the communication interface 111, thereby knowing the detected voltage. Judging by the different voltages detected at the first electrical connection ports TPS11 and TPS21, the processing unit M1 may be able to determine the quantity of slave charging device accordingly.

For example, when the power source P1 provides a five volts power, the voltage detected at the first electrical connection ports TPS21 and TPS11 may be five and four, respectively, and thus the processing unit M1 may determine that there is one slave charging device attached thereto.

For another example, when four slave charging devices are attached to the master charging device, the voltages detected at the corresponding first electrical connection ports, abiding by the sequence from the edge slave charging device to the master charging device, may respectively be five, four, three, two and one. Therefore, the processing unit M1 may determine the quantity based on the received voltage information from the slave charging devices and the detected voltage at the first electrical connection port TPS11.

In some embodiments, if every slave charging device is equipped with a unique identification number (e.g., a serial number), the processing unit M2 may transmit the identification number to the processing unit M1 through the communication interface 121. The processing unit M1 may then determine the quantity of slave charging device according to the received identification number.

After knowing the quantity of slave charging device, the processing unit M1 may determine and assign and address for each slave charging device, such that it may access the slave charging device according to the address. In some embodiments, the address may be an I²C address that corresponds to each communication interface.

Then, the processing unit M1 may request the processing unit M2, through the communication interfaces 111 and 121, to report its available output power, and the processing unit M2 may reply with an available-power information, which indicates the maximum power it can provide, through the same path.

With the knowledge of the power that each slave charging device can provide, the processing unit M1 may determine at least one power option according to the available-power information received and the maximum power that the master charging device itself can provide. The processing unit M1 may then transmit a power information corresponding to the at least one power option to the target device 10 through the charging interface 113. The target device 10 may reply with a power-request information indicating the power option it chose through the charging interface 113.

After receiving the power-request information, the processing unit M1 may determine a power-output distribution among the master charging device itself and the slave charging device. Then, the processing unit M1 may notify processing unit M2 of the power-output distribution through the communication interfaces 111 and 121.

The processing unit M2 may command the power-controller module PC2 to adjust the output power of the charging device 21 according to the power-output distribution received. Accordingly, the power-controller module PC2 may provide a supplementary power to the charging device 11 through the power-control interface. Each supplementary power provided by a slave charging device (in this case, by the charging device 21 only) may be summed up and provided to the target device 10 by the power-controller module PC1 through the charging interface 113, thereby achieving the charging of the target device 10 in cooperation with the charging device 21.

The final power provided to the target device consists of the power provided by the master charging device and the at least one slave charging device, thus it may be greater than the maximum power that any single charging device in the charging system 1 is able to provide. For example, the processing unit M1 may obtain the knowledge (e.g., through the communication interface 111) of that the maximum power the charging device 11 can provide is "18 watts", and the processing unit M2 may also obtain the knowledge (e.g., through the communication interface 121) of that the maximum power the charging device 21 can provide is "30 watts". Then, when detecting (e.g., through the attach/detach detection in fast-charging protocols) that the target device 10 is attached to the charging device 11, the processing unit M1 may notify the target device 10 (e.g., through the fast-charging protocols) that the final power provided to the target device 10 through the charging interface 113 may be "48 watts". Note that the maximum power that each charging device can provide is not necessarily the same, and the final power provided to the target device 10 can be adjusted according to the request of the target device 10.

When the target device 10 requests a different power option, the processing unit M1 may request, e.g., transmitting a power-adjustment command through the communication interface 111, each slave charging device to adjust its output power, such that the power-controller module PC1 may receive a different supplementary power through the power-control interface 112. The processing unit M1 may also command the power-controller module PC1 to adjust the output power of the charging device 11 itself accordingly.

In some embodiments, when the master charging device and the slave charging device are coupled with each other and begin to charge the target device 10, each charging device may operate in a constant-current mode to eliminate the voltage differences among the charging devices of the charging system 1.

In some embodiments, the communication interfaces 111 and 112, power-control interfaces 112 and 122, the first I/O ports G11 and G21, and the electrical connection ports 114 and 124 may all be integrated into a USB-C port. That is, the charging devices 11 and 21 may be coupled with each other through another USB-C port other than the charging interfaces 113 and 123. In this case, a resistor (not shown) connected to 113 may be used for the differentiation of a slave charging device and a target device. Specifically, said resistor may be a resistor of the resistance different from the "Rd" resistance (which is 5.1K ohm) commonly used in the "CC" pin of the USB-C specification. Therefore, once the charging device 21 has been attached to the USB-C port of the charging device 11, the processing unit M1 may detect the different resistance caused by the resistor other than 5.1K ohm and thereby determining that the charging device 21 is a slave charging device instead of a device to be charged. On the other hand, the processing unit M1 may also recognize the target device 10 by detecting the 5.1 K ohm resistance.

Figure 3:
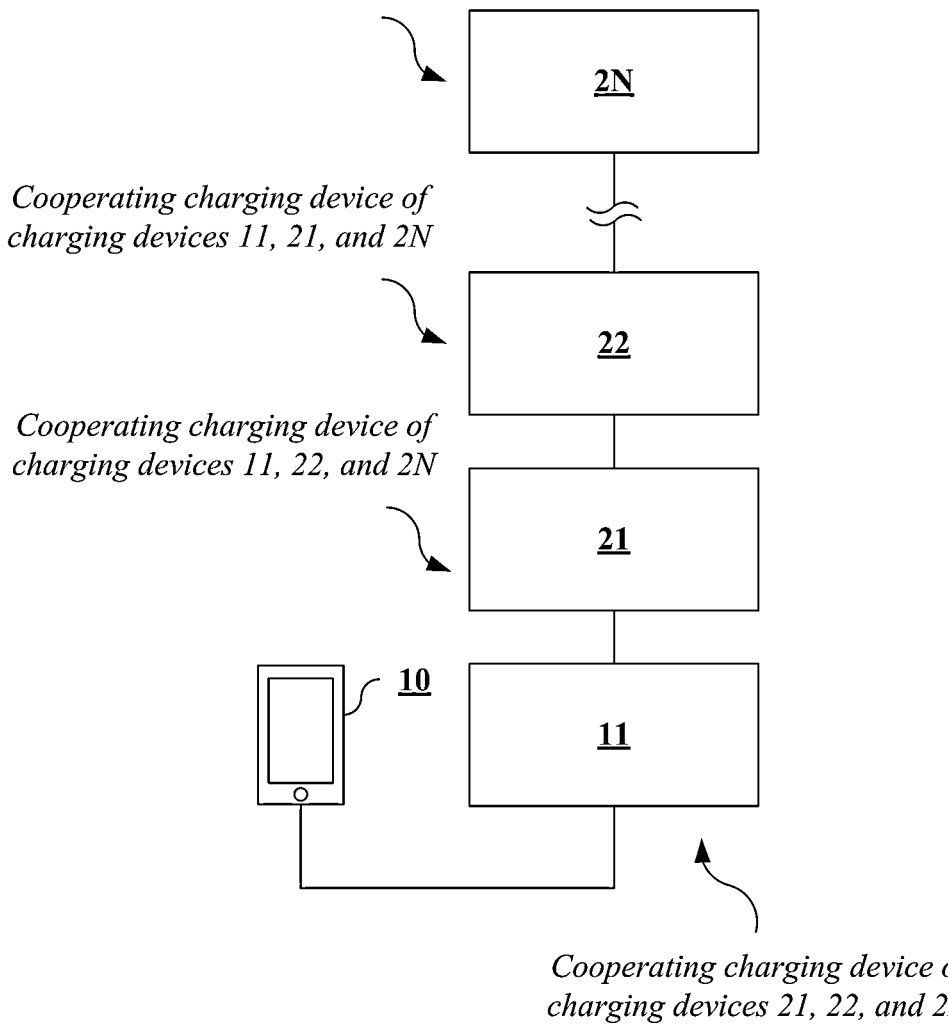
FIG. 3 depicts a schematic view of the charging system as depicted in FIG. 1 and FIG. 2 with more than one slave charging devices according to one or more embodiments of the present disclosure.

FIG. 3 depicts a schematic view of the charging system as depicted in FIG. 1 and FIG. 2 with more than one slave charging devices according to one or more embodiments of the present disclosure. The contents shown in FIG. 3 are only for illustrating the embodiment of the present disclosure, instead of limiting the present disclosure. Note that since the slave charging devices of the charging system 1 can share the same or similar structural design with the master charging device, the detailed structures, connections, and interactions among the charging devices 22, . . . 2N as shown in FIG. 3 can be understood by those of ordinary skills in the art based on the above descriptions of the charging devices 11 and 21, and thus are not further described herein.

Referring to FIG. 1, FIG. 2, and FIG. 3 together, based on various kinds of need, the quantity of slave charging device in the charging system 1 may be increased or decreased. Specifically, when a new slave charging device, e.g., a charging device 22, is to be added into the charging system 1, it may be coupled with the charging device 21 to become the latest edge slave charging device of the charging system 1. The charging device 22 may be coupled with the charging device 21 in the same way as the charging device 21 being coupled with the charging device 11, i.e., coupled through the corresponding communication interfaces, power-control interfaces, and electrical connection ports.

Since the addition of a new charging device or the removal of an existing charging device will both affect the voltages that were detected by other devices at the first electrical connection ports of their own, the processing unit M1 may be aware of the addition or removal of slave charging device by detecting the change of the voltage detected at the first electrical connection port TPS11. In some embodiments, the processing unit M1 may also detect the removal of slave charging device by continuously accessing the address of the existing slave charging device (i.e., transmitting requests and obtaining responses) and see if any of the existing slave charging device is not responding.

Upon detecting the addition or removal of slave charging device, the processing unit M1 may re-determine the quantity of slave charging device and re-assign the address. In addition, the processing unit M1 may also re-determine the power-output distribution of the charging system 1.

In some embodiments, a specific slave charging device (e.g., the charging device 22) of the at least one slave charging device may be configured to charge another target device 20. That is, the specific slave charging device may charge the target device 10 in cooperation with other slave charging devices and the master charging device 11, while simultaneously charging the target device 20, which will inevitably affect the maximum power that the specific slave charging device is able to provide for the target device 10. Therefore, the processing unit M1 may re-determine the power-output distribution when the specific slave charging device is charging the target device 20. For example, the processing unit M1 may rearrange some output loading of the charging device 22 to other slave charging device(s), or even to the master charging device 11 itself, when charging the target device 10.

In some embodiments, the processing unit M1 may arrange a charging subsystem including at least one slave charging device (e.g., the charging device 22, . . . 2N) for charging another target device (e.g., the target device 20). When including more than one slave charging device, the charging subsystem may operate in the same master-slave way as the charging system 1 does, with the slave charging device that is coupled with the other target device (e.g., the charging device 22) being the new master charging device.

The above disclosure is related to the detailed technical contents and inventive features thereof. People of ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A charging device, comprising
a processing unit;
a communication interface coupled with the processing unit, the communication interface being configured to couple the processing unit with at least one cooperating charging device;
a power-controller module electrically connected with the processing unit;
a power-control interface electrically connected with the power-controller module, the power-control interface being configured to couple the power-controller module with the at least one cooperating charging device; and
a charging interface electrically connected with the processing unit and the power-controller module;
wherein the processing unit is configured to determine a character of the charging device in a master-slave relationship with the at least one cooperating charging device based on whether a target device is attached to the charging interface; and
wherein the power-controller module is configured to provide a specific power for the target device in cooperation with the at least one cooperating charging device based on the character.

2. The charging device of claim 1, wherein when determining that the character is a master, the processing unit is further configured to determine a power-output distribution and notify the at least one cooperating charging device of the power-output distribution through the communication interface, and the power-controller module is configured to receive at least one supplementary power from the at least one cooperating charging device through the power-control interface, so as to provide the specific power for the target device in cooperation with the at least one cooperating charging device.

3. The charging device of claim 2, wherein the processing unit is further configured to:
determine a quantity of the at least one cooperating charging device through the communication interface; and
assign an address for each of the at least one cooperating charging device according to the quantity of the at least one cooperating charging device;
wherein the processing unit notifies the at least one cooperating charging device of the power-output distribution according to the address.

4. The charging device of claim 3, wherein the processing unit is further configured to re-determine the quantity and re-assign the address when any of the at least one cooperating charging device has been removed or when a new cooperating charging device has been attached to one of the at least one cooperating charging device.

5. The charging device of claim 2, wherein the processing unit is further configured to re-determine the power-output distribution when any of the at least one cooperating charging device has been removed or when a new cooperating charging device has been attached to the at least one cooperating charging device.

6. The charging device of claim 2, wherein the processing unit is further configured to request each of the at least one cooperating charging device to adjust an output power of the cooperating charging device itself, such that the power-controller module receives a different supplementary power.

7. The charging device of claim 2, wherein the power-controller module provides the specific power for the target device through the charging interface, and the processing unit is further configured to:
receive power-request information from the target device through the charging interface; and
determine the power-output distribution according to the power-request information.

8. The charging device of claim 7, wherein the processing unit is further configured to:
receive available-power information from each of the at least one cooperating charging device through the communication interface;
determine at least one power option according to the available-power information; and
notify the target device of the at least one power option through the charging interface, such that the target device replies with the power-request information according to the at least one power option.

9. The charging device of claim 1, wherein when the character is a slave, the processing unit is further configured to receive a charging command from a master charging device among the at least one cooperating charging device through the communication interface, and the power-controller module is further configured to provide supplementary power to the master charging device through the power-control interface according to the charging command, so as to charge the target device with a specific power in cooperation with the at least one cooperating charging device.

10. The charging device of claim 9, wherein the communication interface is further configured to receive a power-adjustment command from the master charging device, and the power-controller module is further configured to adjust an output power of the charging device itself according to the power-adjustment command.

11. The charging device of claim 9, further comprising:
a first electrical connection port and a second electrical connection port, each being electrically connected with the processing unit and configured to couple with one of the at least one cooperating charging device;
a resistor coupled between the first electrical connection port and the second electrical connection port;
a power source electrically connected with the processing unit and the resistor; and
an input/output (I/O) port electrically connected with the processing unit;
wherein the processing unit is further configured to activate the power source when detecting that the I/O port is floating, so as to provide power to the resistor.

12. The charging device of claim 11, wherein the processing unit is further configured to transmit voltage information of the first electrical connection port to the master charging device through the communication interface, such that the master charging device determines a quantity of charging device and an address of the charging device based on at least the voltage information.

13. The charging device of claim 1, further comprising:
a first electrical connection port and a second electrical connection port, each being electrically connected with the processing unit and configured to couple with one of the at least one cooperating charging device; and
a switch, the switch being electrically connected with the processing unit and the second electrical connection port, wherein the processing unit is further configured to:
turn on the switch when determining that the character is a master, such that the second electrical connection port is coupled with a ground; and
turn off the switch when determining that the character is a slave.

14. The charging device of claim 1, wherein the processing unit determines the character by identifying a specific resistance of the target device through the charging interface.

15. The charging device of claim 1, wherein the specific power is higher than a maximum power that the charging device or the at least one cooperating charging device is configured to provide.

16. The charging device of claim 1, wherein the power-controller module provides the specific power for the target device in cooperation with the at least one cooperating charging device in a constant-current mode.

17. A charging system based on a master-slave relationship, comprising:
a master charging device, being coupled with a target device; and
at least one slave charging device, being electrically connected with the master charging device, wherein an edge slave charging device among the at least one slave charging device is coupled with a power source;
wherein the master charging device is configured to determine a power-output distribution of the master charging device and the at least one slave charging device, and notify the at least one slave charging device of the power-output distribution;
wherein the at least one slave charging device is configured to provide supplementary power to the master charging device according to the power-output distribution; and
wherein the master charging device is further configured to provide a specific power for the target device based on the supplementary power, so as to charge the target device in cooperation with the at least one slave charging device.

18. The charging system of claim 17, wherein a specific slave charging device among the at least one slave charging device is further configured to charge another target device, and the master charging device is further configured to re-determine the power-output distribution when the specific slave charging device is charging the other target device.

19. The charging system of claim 17, wherein the master charging device is further configured to determine a quantity of the at least one slave charging device, and assign an address for each of the at least one slave charging device according to the quantity of the at least one slave charging device;
wherein the master charging device notifies the at least one slave charging device of the power-output distribution according to the address.

20. The charging system of claim 19, wherein the master charging device is further configured to:
- re-determine the quantity of the at least one slave charging device and the power-output distribution; and
- re-assign the address when any of the at least one slave charging device has been removed or when a new slave charging device has been attached to the charging system.

* * * * *